United States Patent
Castano

(10) Patent No.: US 10,777,165 B2
(45) Date of Patent: Sep. 15, 2020

(54) TELEVISION MEDIA INTERFACE ADAPTOR

(71) Applicant: ProTVSolutions LLC, Temecula, CA (US)

(72) Inventor: Guillermo Castano, Tijuana (MX)

(73) Assignee: ProTVSolutions LLC, Temecula, CA (US)

(*) Notice: Subject to any disclaimer, the term of this patent is extended or adjusted under 35 U.S.C. 154(b) by 0 days.

(21) Appl. No.: 15/944,471

(22) Filed: Apr. 3, 2018

(65) Prior Publication Data

US 2018/0286346 A1    Oct. 4, 2018

Related U.S. Application Data

(66) Substitute for application No. 62/481,099, filed on Apr. 3, 2017.

(51) Int. Cl.
| | |
|---|---|
| *G06F 13/38* | (2006.01) |
| *G06F 9/44* | (2018.01) |
| *G09G 5/00* | (2006.01) |
| *H04N 21/4363* | (2011.01) |
| *H04N 21/422* | (2011.01) |

(52) U.S. Cl.
CPC ....... *G09G 5/006* (2013.01); *H04N 21/42204* (2013.01); *H04N 21/42221* (2013.01); *H04N 21/43635* (2013.01); *G09G 2370/06* (2013.01); *G09G 2370/12* (2013.01)

(58) Field of Classification Search
CPC .................. G06F 13/38; G06F 9/44
See application file for complete search history.

(56) References Cited

U.S. PATENT DOCUMENTS

| | | | | |
|---|---|---|---|---|
| 2010/0118193 | A1* | 5/2010 | Boyden | G09G 5/006 348/554 |
| 2012/0242905 | A1* | 9/2012 | Inoue | H04N 21/4108 348/705 |
| 2013/0053992 | A1* | 2/2013 | Higuchi | G09G 5/008 700/94 |
| 2016/0142647 | A1* | 5/2016 | Gopinath | H04N 5/765 348/706 |
| 2018/0234637 | A1* | 8/2018 | Marino | H04N 21/44231 |
| 2018/0316876 | A1* | 11/2018 | Gopinath | H04N 21/4122 |

OTHER PUBLICATIONS

Monoprice HDMI Switch Box Model HD-411E3 User Manual, Nov. 4, 2009—All pages (Year: 2009).*
Monoprice Blackbird 4×1 HDMI 1.4 Switch CEC HDCP 1.4, 1080p@60Hz—Monoprice.com , Nov. 4, 2009—All Pages (Year: 2009).*
Kinivo HDMI Switch 501BN User Manual—All pages (Year: 2012).*

* cited by examiner

*Primary Examiner* — David E Martinez
(74) *Attorney, Agent, or Firm* — Pauly, DeVries Smith & Deffner LLC

(57) ABSTRACT

The present application is directed to adding a CEC engine into a CEC HDMI Switch used to provide universal remote-control capabilities even on TVs that do not support the CEC protocol.

20 Claims, 3 Drawing Sheets

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

FIG. 1

| Operation Id | User Operation |
|---|---|
| 0x00 | Select |
| 0x01 | Up |
| 0x02 | Down |
| 0x03 | Left |
| 0x04 | Right |
| 0x05 | Right-Up |
| 0x06 | Right-Down |
| 0x07 | Left-Up |
| 0x08 | Left-Down |
| 0x09 | Root Menu - see Note 2 |
| 0x0A | Setup Menu |
| 0x0B | Contents Menu |
| 0x0C | Favorite Menu |
| 0x0D | Exit |
| 0x0E - 0x1F | Reserved |
| 0x20 - 0x29 | Numbers 0-9 |
| 0x2A | Dot |
| 0x2B | Enter |
| 0x2C | Clear |
| 0x2D - 0x2e | Reserved |
| 0x2F | Next Favorite |
| 0x30 | Channel Up |
| 0x31 | Channel Down |
| 0x32 | Previous Channel |
| 0x33 | Sound Select |
| 0x34 | Input Select |

| Operation Id | User Operation |
|---|---|
| 0x35 | Display Information |
| 0x36 | Help |
| 0x37 | Page Up |
| 0x38 | Page Down |
| 0x39 - 0x3F | Reserved |
| 0x40 | Power |
| 0x41 | Volume Up |
| 0x42 | Volume Down |
| 0x43 | Mute |
| 0x44 | Play |
| 0x45 | Stop |
| 0x46 | Pause |
| 0x47 | Record |
| 0x48 | Rewind |
| 0x49 | Fast forward |
| 0x4A | Eject |
| 0x4B | Forward |
| 0x4C | Backward |
| 0x4D | Stop-Record |
| 0x4E | Pause-Record |
| 0x4F | Reserve |
| 0x50 | Angle |
| 0x51 | Sub picture |
| 0x52 | Video on Demand |
| 0x53 | Electronic Program Guide |
| 0x54 | Timer Programming |

| Operation Id | User Operation |
|---|---|
| 0x55 | Initial Configuration |
| 0x56 - 0x5f | Reserved |
| 0x60 | Play Function |
| 0x61 | Pause-Play Function |
| 0x62 | Record Function |
| 0x63 | Pause-Record Function |
| 0x64 | Stop Function |
| 0x65 | Mute Function |
| 0x66 | Restore Volume Function |
| 0x67 | Tune Function |
| 0x68 | Select Media Function |
| 0x69 | Select A/V Input Function |
| 0x6A | Select Audio Input Function |
| 0x6B | Power Toggle Function |
| 0x6C | Power Off Function |
| 0x6D | Power On Function |
| 0x6E - 0x70 | Reserved |
| 0x71 | F1 (Blue) |
| 0x72 | F2 (Red) |
| 0x73 | F3 (Green) |
| 0x74 | F4 (Yellow) |
| 0x75 | F5 |
| 0x76 | Data - see Note 3 |
| 0x77 - 0xFF | Reserved |

FIG. 2

TELEVISION MEDIA INTERFACE ADAPTOR

This application claims the benefit of U.S. Provisional Application No. 62/481,099 filed Apr. 3, 2017, the content of which is herein incorporated by reference in its entirety.

FIELD

The present application is directed to adding a Consumer Electronics Control (CEC) engine into a CEC HDMI switch used to provide universal remote-control capabilities even on TVs that do not support the CEC protocol.

BACKGROUND

When a TV that supports CEC is connected to a Blu-ray player, the combination provides the user with additional features, such as one touch play process that allows the TV to automatically change to the Blu-Ray player, when it turns on.

There are several functions and processes that are defined by the CEC standard that are useful for the present application. For example, when the TV, knowing that is connected to the Blu-ray disk player and displaying its content is able to use its normal remote control, without any modification or special setup to control the Blu-ray player.

This process of using the TV's remote to control a different device, even when they belong to different brands, is a powerful process that can be exploited to develop and alternative to the overcomplicated and typically expensive universal remote controls. Devices may belong to categories such as TV, Player, Recording Device, Tuner or Audio System. The Remote Control Pass Through process allows for a TV to send a universal control code to the device currently on display. The commands are standardized and supported by all brands and manufacturers. Unfortunately, the CEC standard has not taken off as much as was expected. While 100% of Blu-ray players support it, less than 30% of TVs in the market have implemented CEC on their TVs. Manufacturers have chosen to include CEC control on some of their high-end products but may not include it in lower end models. The result is that the great potential for creating an effective solution to the multiple remote control in the living room has not come to pass.

SUMMARY

The system and product described herein is geared to the hospitality business in some embodiments. The disclosed device allows detection of the Blu-ray player when it turns on to automatically switch the TV to the proper input, and to return the TV back to the normal content when it is turn off. Additionally, the device is capable of detecting the TV's or cable box remote and derive the keys necessary to control the Blu-ray disk player, making the system a single remote process.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures, in which:

FIG. 1 is a table showing device numbers ID address and devices assigned under the CEC protocol.

FIG. 2 is table showing various operations under the CEC protocol.

DETAILED DESCRIPTION

Figure 3:
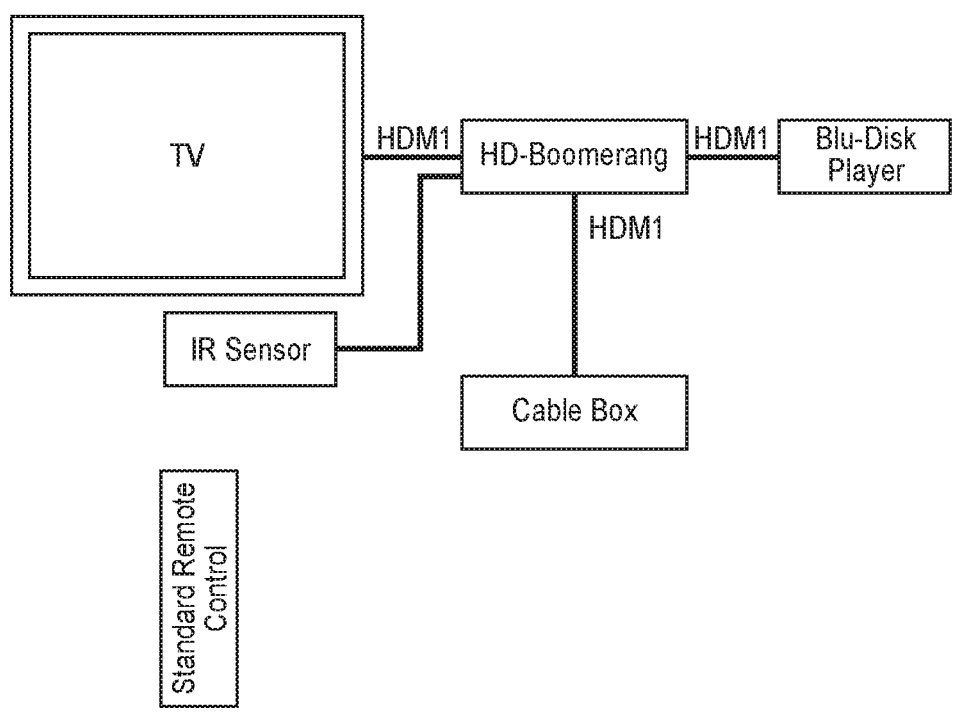
FIG. 3 is a system diagram of an example system made in accordance with the present disclosure While embodiments are susceptible to various modifications and alternative forms, specifics thereof have been shown by way of example and drawings and will be described in detail. It should be understood, however, that the scope herein is not limited to the particular embodiments described. On the contrary, the intention is to cover modifications, equivalents, and alternatives falling within the spirit and scope herein.

HDMI has become the default standard for connectivity of audio/video devices for TVs.

For example, the HDMI standard as of version 1.3a implemented the Consumer Electronics Control (CEC) protocol of communication to provide a process that would allow connectivity across different types of equipment regardless of brand.

CEC has a TV as the center of attention, and devices such as Players, Tuners and audio Systems may be connected and interoperate together. Examples of Players are the Blu-ray disk player, Examples of Tuners are Satellite receivers When a TV that supports CEC is connected to a Blu-ray player, the combination provides the user with additional features, such as one touch play process that allows the TV to automatically change to the Blu-Ray player, when it turns on.

There are several functions and processes that are defined by the CEC standard that are useful for the present application. For example, when the TV, knowing that is connected to the Blu-ray disk player and displaying its content is able to use its normal remote control, without any modification or special setup to control the Blu-ray player.

This process of using the TV's remote to control a different device, even when they belong to different brands, is a powerful process that can be exploited to develop and alternative to the overcomplicated and typically expensive universal remote controls.

For details on the entire CEC protocol, please refer to the "High-Definition Multimedia Interface" Specification Version 1.3a published by the HDMI Consortium. The CEC standard defines up to 15 devices each with its own assigned ID.

Devices may belong to categories such as TV, Player, Recording Device, Tuner or Audio System. The Remote Control Pass Through process allows for a TV to send a universal control code to the device currently on display.

The commands are standardized and supported by all brands and manufacturers.

Unfortunately, the CEC standard has not taken off as much as was expected. While 100% of Blu-ray players support it, less than 30% of TVs in the market have implemented CEC on their TVs. Manufacturers have chosen to include CEC control on some of their high-end products but may not include it in lower end models. The result is that the great potential for creating an effective solution to the multiple remote control in the living room has not come to pass.

The system and product described herein is geared to the hospitality business in some embodiments. In many cases hotels offer the use of a Blu-ray disk player on the room, and as it happens in homes, they provide two remote controls, one for the TV and one for the player. The present disclosures includes a smart HDMI switch that implements a CEC engine that simulates the controls offered normally by the TV. By implementing the TV-CEC it is possible support any TV in play as it no longer needs to support CEC.

The disclosed device allows detection of the Blu-ray player when it turns on to automatically switch the TV to the proper input, and to return the TV back to the normal content when it is turn off. Additionally, the device is capable of detecting the TV's or cable box remote and derive the keys necessary to control the Blu-ray disk player, making the system a single remote process.

The product includes a controller, shown in FIG. 3 as the "HD-Boomerang", that sits between the cable box (or other cable access device) or other similar media source and the Blu-ray Player where it can switch the contents to the TV depending on the user's intent. Signals from the standard remote control are pickup by an IR sensor and processed by the device, where translation to the CEC pass-through process takes place to control the player when required.

More specifically, the disclosure is directed to a system for adding Consumer Electronics Control (CEC) engine into a controller switch, the system comprising a) a controller box; b) a television; c) a cable access device; d) an additional media device; wherein the controller box is connected to the television, cable access device, and additional media device; and wherein the controller box allows for switching between content from the cable access device and the additional media device displayed on the television.

In some implementations of the system for adding CEC engine, the controller box is connected to the television by an HDMI cable.

In some implementations of the system for adding CEC engine, the controller box is connected to the cable access device by an HDMI cable.

In some implementations of the system for adding CEC engine, the controller box is connected to the additional media device by an HDMI cable.

In some implementations of the system for adding CEC engine, the additional media device comprising a DVD player.

In some implementations of the system for adding CEC engine, the additional media device comprising a Blu-Disk player.

In some implementations of the system for adding CEC engine, the controller is able to control each of the television, cable access device, and additional media device, including turning the television, cable access device, and additional media device on and off.

In some implementations of the system for adding CEC engine, the controller is able to control each of the television, cable access device, and additional media device, including turning one of the cable access device and additional media device on when the other devices are turned off.

In some implementations of the system for adding CEC engine, the controller is able to control each of the television, cable access device, and additional media device, including turning one of the cable access device and additional media device off when the television is turned off.

In some implementations of the system for adding CEC engine, the controller able to control a television that does not support the Consumer Electronic Control protocol.

Also disclosed is a method for adding Consumer Electronics Control engine into a controller switch, the system comprising a) providing a controller box; b) providing a television; c) providing a cable access device; d) providing an additional media device; wherein the controller box is connected to the television, cable access device, and additional media device; and wherein the controller box allows for switching between content from the cable access device and the additional media device displayed on the television.

In some implementations of the method for adding CEC engine, the controller box is connected to the television by an HDMI cable.

T In some implementations of the method for adding CEC engine, the controller box is connected to the cable access device by an HDMI cable.

In some implementations of the method for adding CEC engine, the controller box is connected to the additional media device by an HDMI cable.

In some implementations of the method for adding CEC engine, the additional media device comprising a DVD player.

In some implementations of the method for adding CEC engine, the additional media device comprising a Blu-Disk player.

In some implementations of the method for adding CEC engine, the controller able to control each of the television, cable access device, and additional media device, including turning the television, cable access device, and additional media device on and off.

In some implementations of the method for adding CEC engine, the controller able to control each of the television, cable access device, and additional media device, including turning one of the cable access device and additional media device on when the other devices are turned off.

In some implementations of the method for adding CEC engine, the controller able to control each of the television, cable access device, and additional media device, including turning one of the cable access device and additional media device off when the television is turned off.

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Aspects may be better understood with reference to the following examples. These examples are intended to be representative of specific embodiments but are not intended as limiting the overall scope of embodiments herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. A system for adding Consumer Electronics Control engine into a controller switch, the system comprising:
    a) a controller box;
    b) a television;
    c) a first media device;
    d) an additional media device;
    e) a remote control configured to provide instructions to the first media device but not the additional media device; and
    f) an infrared sensor on the controller box;
    wherein the controller box is connected to the television, first media device, and infrared sensor on the controller box;
    and
    wherein signals that are not in Consumer Electronics Control (CEC) are sent from the remote control configured to provide instructions to the first media device are received by the infrared sensor on the controller box and are translated to Consumer Electronics Control (CEC) format and then passed through to the additional media device as CEC commands so that the user is able to control each of the television, first media device, and additional media device, from the single remote control belonging to the first media device such that when the controller box receives a command it sends CEC format signals to the appropriate media device of the first media device and additional media devices.

2. The system for adding Consumer Electronics Control engine into a controller switch of claim 1, wherein the controller box is connected to the television by an HDMI cable.

3. The system for adding Consumer Electronics Control engine into a controller switch of claim 1, wherein the controller box is connected to the cable access device by an HDMI cable.

4. The system for adding Consumer Electronics Control engine into a controller switch of claim 1, wherein the controller box is connected to the additional media device by an HDMI cable.

5. The system for adding Consumer Electronics Control engine into a controller switch of claim 1, the additional media device comprising a DVD player.

6. The system for adding Consumer Electronics Control engine into a controller switch of claim 1, the additional media device comprising a Blu-Disc player.

7. The system for adding Consumer Electronics Control engine into a controller switch of claim 1, the controller able to control each of the television, cable access device, and additional media device, including turning the television, cable access device, and additional media device on and off.

8. The system for adding Consumer Electronics Control engine into a controller switch of claim 1, the controller able to control each of the television, cable access device, and additional media device, including turning one of the cable access device and additional media device on when the other devices are turned off.

9. The system for adding Consumer Electronics Control engine into a controller switch of claim 1, the controller able to control each of the television, cable access device, and additional media device, including turning one of the cable access device and additional media device off when the television is turned off.

10. The system for adding Consumer Electronics Control engine into a controller switch of claim 1, the controller able to control the television that does not support the Consumer Electronic Control protocol.

11. A method for adding Consumer Electronics Control engine into a controller switch, the system comprising:
    a) providing a controller box;
    b) providing a television;
    c) providing a cable access device;
    d) providing an additional media device;
    wherein the controller box is connected to the television, and cable access device; and
    e) an infrared sensor;
    wherein the controller box allows for switching between content from the cable access device and the additional media device displayed on the television;
    wherein signals that are not in CEC format received from the infrared sensor are translated to CEC format and then passed through to an additional media device that is a CEC device and the controller is able to control each of the television, cable access device.

12. The method for adding Consumer Electronics Control engine into a controller switch of claim 11, wherein the controller box is connected to the television by an HDMI cable.

13. The method for adding Consumer Electronics Control engine into a controller switch of claim 11, wherein the controller box is connected to the cable access device by an HDMI cable.

14. The method for adding Consumer Electronics Control engine into a controller switch of claim 11, wherein the controller box is connected to the additional media device by an HDMI cable.

15. The method for adding Consumer Electronics Control engine into a controller switch of claim 11, the additional media device comprising a DVD player.

16. The method for adding Consumer Electronics Control engine into a controller switch of claim 11, the additional media device comprising a Blu-Disk player.

17. The method for adding Consumer Electronics Control engine into a controller switch of claim 11, the controller able to control each of the television, cable access device, and additional media device, including turning the television, cable access device, and additional media device on and off.

18. The method for adding Consumer Electronics Control engine into a controller switch of claim 11, the controller able to control each of the television, cable access device, and additional media device, including turning one of the cable access device and additional media device on when the other devices are turned off.

19. The method for adding Consumer Electronics Control engine into a controller switch of claim 11, the controller able to control each of the television, cable access device, and additional media device, including turning one of the cable access device and additional media device off when the television is turned off.

20. A system and method directed to adding a Consumer Electronics Control (CEC) engine into a CEC HDMI switch used to provide universal remote-control capabilities even on TVs that do not support the CEC protocol as described herein.

* * * * *